US011854267B2

(12) United States Patent
Sim et al.

(10) Patent No.: US 11,854,267 B2
(45) Date of Patent: Dec. 26, 2023

(54) SYSTEM AND METHOD FOR WITNESS REPORT ASSISTANT

(71) Applicant: MOTOROLA SOLUTIONS, INC., Chicago, IL (US)

(72) Inventors: Moh Lim Sim, Bayan Lepas (MY); Ling Hock Koh, Jelutong (MY); Nur Diyana Mohd Asri, Bayan Lepas (MY); Chun Hock Lee, Sungai Petani (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 132 days.

(21) Appl. No.: 17/643,437

(22) Filed: Dec. 9, 2021

(65) Prior Publication Data
US 2023/0186633 A1    Jun. 15, 2023

(51) Int. Cl.
*G06V 20/52* (2022.01)
*G06V 40/20* (2022.01)
*H04N 23/695* (2023.01)
*G10L 15/26* (2006.01)

(52) U.S. Cl.
CPC ............. *G06V 20/52* (2022.01); *G06V 40/28* (2022.01); *G10L 15/26* (2013.01); *H04N 23/695* (2023.01)

(58) Field of Classification Search
None
See application file for complete search history.

(56) References Cited

U.S. PATENT DOCUMENTS

| 7,138,963 | B2* | 11/2006 | Hobgood | G06T 15/20 |
| | | | | 345/9 |
| 9,488,488 | B2* | 11/2016 | Waldman | G01C 21/3679 |
| 9,691,189 | B1* | 6/2017 | Creath | G07C 1/00 |
| 10,102,586 | B1* | 10/2018 | Marlow | B64C 39/024 |
| 10,719,966 | B1* | 7/2020 | Davis | G06F 16/29 |
| 10,921,949 | B2* | 2/2021 | Holz | G06F 3/0346 |

(Continued)

FOREIGN PATENT DOCUMENTS

WO    2017139229 A1    8/2017

OTHER PUBLICATIONS

Sieberth Till et al: "A toolbox for the rapid prototyping of crime scene reconstructions in virtual reality", Forensic Science International, Elsevier B.V, Amsterdam, NL, vol. 305, Oct. 24, 2019 (Oct. 24, 2019), XP085930716, ISSN: 0379-0738, DOI: 10.1016/J. FORSCIINT.2019.110006 [retrieved on Oct. 24, 2019] Section 2, all pages.

(Continued)

*Primary Examiner* — Ricky Chin (57) ABSTRACT

Techniques for a witness report assistant are provided. At least one camera captures at least one image of an incident scene. The incident scene is a location of an incident. A description is of the incident is received from a witness to the incident. The description of the incident includes a generic reference to an element of the incident scene. The description of the incident scene is transcribed to create a textual description. The element of the incident scene within the at least one image of the incident scene is identified. A specific identifier associated with the element of the incident scene is determined. The textual transcript of the description is supplemented with the specific identifier.

20 Claims, 6 Drawing Sheets

(56) References Cited

U.S. PATENT DOCUMENTS

| | | | | |
|---|---|---|---|---|
| 10,943,463 | B1* | 3/2021 | Clark | G08B 21/0438 |
| 10,956,981 | B1* | 3/2021 | Fields | G06Q 40/08 |
| 11,308,741 | B1* | 4/2022 | Cardona | G08G 1/0112 |
| 2019/0156558 | A1* | 5/2019 | Neeter | G06T 17/00 |
| 2022/0027625 | A1* | 1/2022 | Brake | G10L 17/22 |
| 2022/0374585 | A1* | 11/2022 | Wang | G11B 27/031 |
| 2022/0377403 | A1* | 11/2022 | Lu | H04N 21/4312 |
| 2023/0076821 | A1* | 3/2023 | Smith | G10L 15/26 |
| 2023/0186633 | A1* | 6/2023 | Sim | G06V 40/28 |
| | | | | 348/143 |

OTHER PUBLICATIONS

Sieberth Till et al: "Applying virtual reality in forensics—a virtual scene walkthrough", Forensic Science, Medicine, and Pathology, Springer US, Boston, vol. 15, No. 1, Dec. 6, 2018 (Dec. 6, 2018), pp. 41-47, XP036695779, ISSN: 1547-769X, DOI: 10.1007/SI2024-018-0058-8 [retrieved on Dec. 6, 2018] abstract pp. 42,44, all pages.

The International Search Report and the Written Opinion, corresponding patent application No. PCT/US2022/051215 filed: Nov. 29, 2022 dated Mar. 22, 2023, all pages.

Chee, Chong Hin et al: "Device and Method for Augmenting Images of an Incident Scene With Object Description", U.S. Appl. No. 17/179,667, filed Feb. 19, 2021, all pages.

* cited by examiner

SYSTEM AND METHOD FOR WITNESS REPORT ASSISTANT

BACKGROUND

One of the tasks of public safety first responders that are responding to a public safety incident may be to gather information about the incident. Information can include biologic forensic information, such as fingerprints or DNA samples. Information can be other physical evidence, such as bullet casings, road measurements in the case of a traffic incident, pictures of the incident scene, etc. One particularly valuable form of evidence may be statements made by people who have witnessed the incident. For example, in the case of a car accident, a person who witnessed the accident may provide a statement that includes what the person saw.

Although a public safety responder may transcribe a witness statement manually (e.g. with paper and pen, by typing into a computer, etc.) such a manual process may be inconvenient and/or inefficient. To alleviate this problem, often times a witness statement may be recorded. By recording the witness statement, the officer is freed from transcribing the witness statement and can instead focus on listening to what the witness is actually saying. In order to ensure that the witness statement is accurately captured in a textual report, the recorded witness statement may be automatically transcribed into text that can be included in the report. The transcription process may occur in real time, as the witness is making the statement, or it may occur offline, at a later time, by using the recording of the witness statement.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The ability to automatically and directly transcribe a witness statement into a report is a great aid to first responders. As mentioned above, the first responder can pay attention to what the witness is saying, rather than focusing on taking notes or typing what the witness says to manually transcribe the witness statement. Furthermore, machine transcription may aid in ensuring that the witness statement is correctly transcribed into the written report with less of a chance for error than with a human performing the transcription. Automatic transcription methods are continuously improving and their accuracy is ever increasing.

A problem arises in that sometimes a witness statement, although perfectly transcribed, may result in a confusing written description. For example, consider the case where a witness saw a reckless driver and is making a statement to a first responder who is filling out a report. The witness may say, "I saw the car on this street. It then turned that way onto that street." While making the statement, the witness may have used their hands to point to the specific thing he was referencing. For example, when he said "this street" he may have been pointing to the street where he first saw the car. Similarly, when he said "it turned that way" they may have made a motion with their hands indicating the direction of the turn. Finally, when they said "that street" they may have pointed in the direction of the street the car turned onto.

A first responder hearing this witness statement may gain a general understanding of the information that the witness is trying to convey, as they can see the motions and/or gestures the witness is making and can correlate that to what they are viewing at the incident scene. However, the transcript itself, which may be a completely accurate transcription of the statement made by the witness, may not be as useful. For example, the statement "this street" without knowing what the witness was pointing at is not very helpful. In many cases, the written transcript may be all that is available for use in later proceedings (e.g. court, lawsuits, etc.).

The problem does not solely exist with a witness describing an incident scene using generic terms and corresponding gestures. In some cases, the witness may not even know the actual name of the element being pointed to. For example, consider a case of a tourist who is a victim of a crime. The witness may make a statement such as, "The man grabbed my purse and ran into that big building." The tourist may not know the name of the building or the building address. In some cases, the witness may be in an altered state of mind (e.g. was just involved in a car accident and is confused, etc.) and are unable to provide specific details, even if they knew them, due to their incapacity. For example, a victim of a car accident may be so flustered that they are only able to say the car that hit them came from "that direction" instead of being able to say the car came from a specific cardinal direction on a specific street. Regardless of the reason why, what should be understood is that the witness may make a statement that includes generic identifiers while physically pointing to a specific item and/or direction, etc. at the incident scene.

The techniques described herein solve these problems individually and collectively. One or more cameras, such as body worn cameras, augmented reality smart glasses, police dash cameras, closed circuit television (CCTV) cameras, etc. monitor an incident scene where a witness statement is being taken. Audio analytics are used to identify keywords that are spoken by the witness making the statement. Video analytics are used to determine what a witness was pointing at/gesturing toward when the keywords were uttered. Contextual information about the incident type may be used to help correlate the spoken keywords with the witness physical actions.

In some cases, the witness and/or interviewer will have an option to wear augmented reality (AR) glasses which can display the incident scene as being captured by the one or more cameras and provide an indication of what the system believes the witness was pointing to via a visual indication. If the system is incorrect in its initial determination of what was being pointed to, the witness may correct the initial determination. Although AR glasses have been mentioned, it should be understood that the visual interface could be any other type of video display (e.g. tablet, laptop screen, computer monitor, cell phone screen, walkie talkie screen, etc.).

The system may then take the generic identifier (e.g. "that street", etc.) and correlate with a specific identifier (e.g. Elm Street, etc.) based on the location in the video image that the witness was pointing to. For example, if a witness was pointing to a specific street, a geographic information service (GIS) database may be used to determine the specific street name of the location where the witness was pointing. The textual transcript may then be supplemented by including the specific identifier for the identified element. The first responder and/or witness may be given the option to accept or edit the proposed specific identifier. Other examples of replacing generic identifiers with specific identifiers are presented in conjunction with FIGS. 1-4.

A method is provided. The method includes capturing, with at least one camera, at least one image of an incident scene, wherein the incident scene is a location of an incident. The method also includes receiving, from a witness to the incident, a description of the incident, wherein the description of the incident includes a generic reference to an element of the incident scene. The method also includes transcribing the description of the incident scene to create a textual transcript. The method also includes identifying the element of the incident scene within the at least one image of the incident scene. The method also includes determining a specific identifier associated with the element of the incident scene. The method also includes supplementing the textual transcript of the description with the specific identifier.

In one aspect, the generic reference to the element of the incident scene includes a hand gesture from the witness indicating the element of the scene. In one aspect, the generic reference to the element of the incident scene includes a hand gesture from the witness indicating at least one of a direction of motion and an initial and terminal location. In one aspect, the generic reference to the element of the incident scene includes detection of a keyword in the description of the incident from the witness.

In one aspect, the method further comprises altering a field of view of the at least one camera based on the description of the incident received from the witness. In one aspect, identifying the specific identifier associated with the element of the incident scene further comprises determining a context of the incident and identifying the specific identifier that is consistent with the context of the incident. In one aspect, determining the context of the incident further comprises receiving contextual information from descriptions of the incident provided by at least one other witness.

A system is provided. The system comprises a processor and a memory coupled to the processor. The memory contains a set of instructions thereon that when executed by the processor cause the processor to capture, with at least one camera, at least one image of an incident scene, wherein the incident scene is a location of an incident. The instructions further cause the processor to receive, from a witness to the incident, a description of the incident, wherein the description of the incident includes a generic reference to an element of the incident scene. The instructions further cause the processor to transcribe the description of the incident scene to create a textual transcript. The instructions further cause the processor to identify the element of the incident scene within the at least one image of the incident scene. The instructions further cause the processor to determine a specific identifier associated with the element of the incident scene. The instructions further cause the processor to supplement the textual transcript of the description with the specific identifier.

In one aspect, the generic reference to the element of the incident scene includes instructions to detect a hand gesture from the witness indicating the element of the scene. In one aspect, the generic reference to the element of the incident scene includes instructions to detect a hand gesture from the witness indicating at least one of a direction of motion and an initial and terminal location. In one aspect, the generic reference to the element of the incident scene includes instructions to detect a keyword in the description of the incident from the witness.

In one aspect, the system further comprises instructions to alter a field of view of the at least one camera based on the description of the incident received from the witness. In one aspect, the instructions to identify the specific identifier associated with the element of the incident scene further comprises instructions to determine a context of the incident and identify the specific identifier that is consistent with the context of the incident. In one aspect, the instructions to determine the context of the incident further comprises instructions to receive contextual information from descriptions of the incident provided by at least one other witness.

A non-transitory processor readable medium is provided. The medium contains a set of instructions thereon that when executed by a processor cause the processor to capture, with at least one camera, at least one image of an incident scene, wherein the incident scene is a location of an incident. The instructions on the medium further cause the processor to receive, from a witness to the incident, a description of the incident, wherein the description of the incident includes a generic reference to an element of the incident scene. The instructions on the medium further cause the processor to transcribe the description of the incident scene to create a textual transcript. The instructions on the medium further cause the processor to identify the element of the incident scene within the at least one image of the incident scene. The instructions on the medium further cause the processor to determine a specific identifier associated with the element of the incident scene. The instructions on the medium further cause the processor to supplement the textual transcript of the description with the specific identifier.

In one aspect, the generic reference to the element of the incident scene includes instructions on the medium to detect a hand gesture from the witness indicating the element of the scene. In one aspect, the generic reference to the element of the incident scene includes instructions on the medium to detect a hand gesture from the witness indicating at least one of a direction of motion and an initial and terminal location. In one aspect, the generic reference to the element of the incident scene includes instructions on the medium to detect a keyword in the description of the incident from the witness.

In one aspect, the medium further comprises instructions to alter a field of view of the at least one camera based on the description of the incident received from the witness. In one aspect, the instructions on the medium to identify the specific identifier associated with the element of the incident scene further comprises instructions to determine a context of the incident and identify the specific identifier that is consistent with the context of the incident. In one aspect, the instructions on the medium to determine the context of the incident further comprises instructions to receive contextual information from descriptions of the incident provided by at least one other witness.

Further advantages and features consistent with this disclosure will be set forth in the following detailed description, with reference to the figures.

Figure 1:
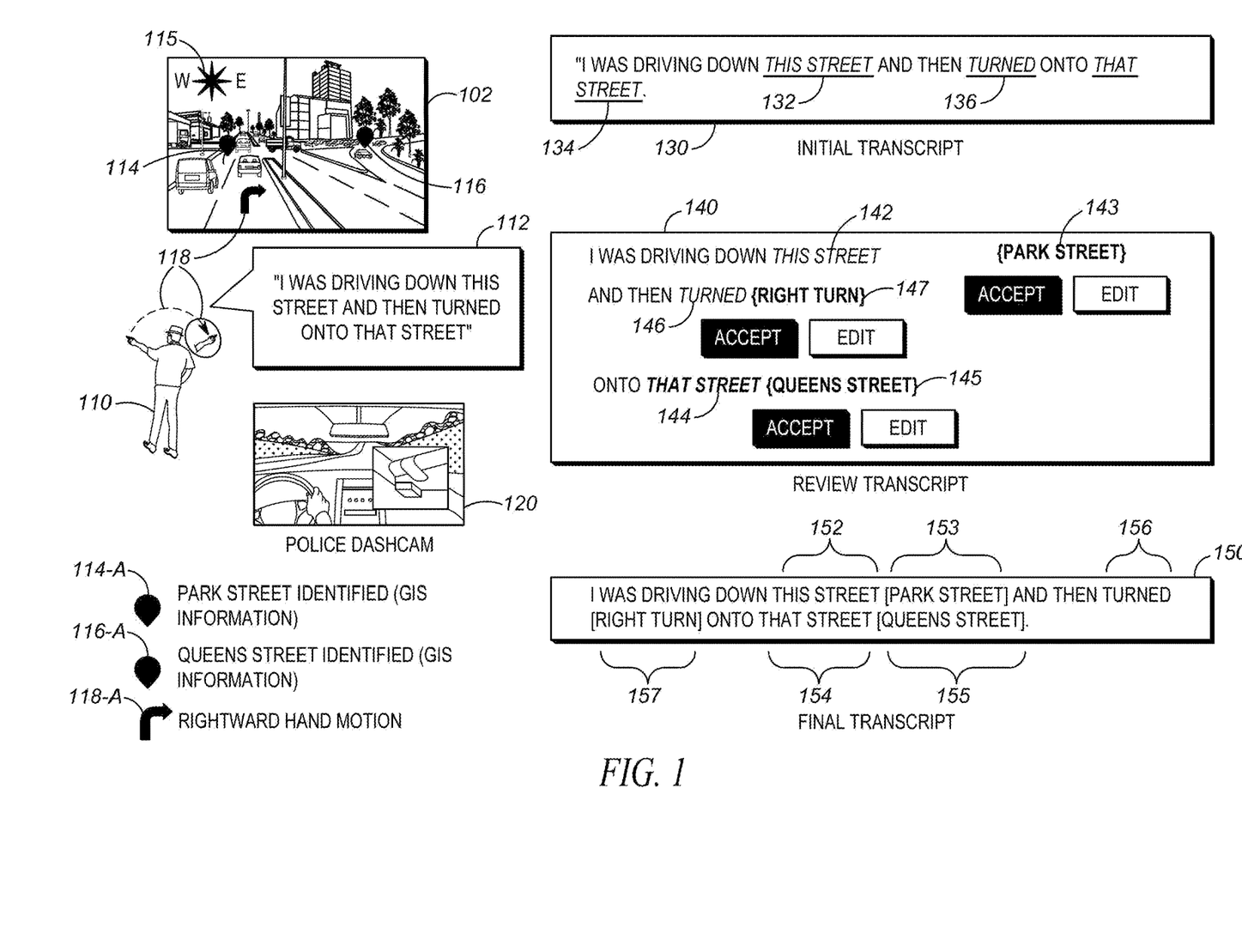
FIG. 1 is an example of converting generic locations and action to specific names and actions, in accordance with the techniques described herein.

FIG. 1 is an example of converting generic locations and actions to specific names and actions, in accordance with the techniques described herein. FIG. 1 depicts an example incident scene 102, which in this case may be a traffic incident. As shown, there are multiple roads within the scene, as well as multiple vehicles within the scene. Assume for purposes of this description that there was some type of traffic incident (e.g. a small accident, a hit and run driver, etc.).

A first responder, such as a law enforcement officer (not shown) may arrive at incident scene 102 to take a statement from a witness 110. In this particular example, assume that the law enforcement officer arrived in a vehicle that includes a camera, such as a police dash(board) camera 120. Although only a single camera is shown in FIG. 1, it should be understood that there may be any number of cameras present at the incident scene. As will be explained in further detail below, multiple cameras with multiple fields of view may assist the system in determining where exactly within the incident scene the witness 110 is pointing.

The witness 110 may make a statement to the first responder. In this example, the witness may say, "I was driving down this street and then turned onto that street." 112. As explained above, the system may monitor and/or record the audio of the witness statement. The witness statement may then be automatically transcribed as an initial transcript 130. As should be clear from the initial transcript 130, absent the video, it is unclear what the witness is referring to. For example, "this street" absent further context could mean any street. "That Street" could also mean any street. "Turned" is ambiguous as it is unclear if it was a right turn, a left turn, turning around, etc. What should be understood is that the initial witness transcript includes multiple generic identifiers, that when read in the absence of further context are completely ambiguous.

The techniques described herein resolve these ambiguities by supplementing the generic identifiers with specific identifiers. The first step in the process may be to use analytics to identify keywords in the initial transcript 130. In the example initial transcript 130 shown, keywords could include the generic identifiers. In this case, "street" may be a keyword, as a street is a generic identifier for a specific street. The analytics may identify the two keywords/key phrases "this street" 132 and "that street" 134. These two keywords are shown as underlined in the initial transcript 130. It should be understood that the initial transcript 130 is being presented for purposes of description and may not actually be presented to the first responder and/or witness in an actual implementation, but may instead be the result of an initial processing step whose output is used later, as will be described in further detail below. Other examples of generic identifiers could include cardinal directions (e.g. East, west, etc.). The system, based on position of the cameras could determine the compass direction 115 the witness was pointing to.

Once the keywords are identified video analytics may be used on the video images produced by the cameras, such as the dash camera 120 to determine what the witness was pointing to when they uttered the keyword. In this example, the witness may have been pointing to point 114 in the incident scene when they said the keyword "this street" 132 thus allowing the system to determine the location in the video image that was being referenced by "this street." Similarly, the location 116 could have been pointed to by the witness when the phrase "that street" was uttered. The system would then know where in the incident scene the witness was pointing when the keywords were said as those points could be identified in the video image. As will be explained in further detail below with respect to FIG. 3, the witness may be given the option to correct what the system has determined that the witness was pointing to by moving the visual markers 114, 116.

It should be understood that although a single camera is described, in an actual implementation, there may be many cameras that capture the incident scene. For example, in addition to the dash camera 120, there may be other cameras such as police body worn cameras, CCTV cameras, private surveillance cameras, drone cameras, video footage captured by private cell phone cameras, etc. All available video imagery may be combined to help determine where in the incident scene the witness is pointing. For example, if the incident scene is captured by two or more cameras, those different fields of view could be used, along with the pointing gesture of the witness, to triangulate exactly where in the incident scene the witness is pointing. Although multiple cameras would be useful, it should be understood that techniques exist to determine where a person is pointing within an image scene that only rely on a single camera.

Once the specific locations pointed to within the video of the incident scene are identified, the specific references to those locations may be determined by looking up the location in a geographic information system (GIS). There are currently many mapping applications available that provide an image of a scene and allow an indicator such as a pin to be dropped within the image scene. The GIS system may then produce specific information associated with the dropped pin. In this case location 114 could be identified as Park Street 114-A from the GIS. Likewise location 116 could be identified as Queens Street 116-A from the GIS. It should be noted that the system may use the context of the keyword to ignore other objects within the video image. For example, because the witness used the keyword street, the system can ignore other items in the video image (e.g. cars, buildings, traffic lights, etc.) as none of those items are streets.

In addition to the keywords that are detected as described above, the analytics may also detect actions that are included in the witness statement. For example, the witness, in the initial transcript 130 said he "turned" onto that street. As shown, the action turned is highlighted by being underlined.

In addition to identifying specific locations pointed to by the witness, the video analytics system could also identify motions, such as gestures made by the witness. For example, the witness initially may have said he was driving down "this street" and pointed to the street he started from. The witness may then have swung his hand from an initial location 114 at the left to a final location 116 at the right while saying that he turned. In general, the witness motion was from left to right 118 indicating a rightward motion. The system may then correlate the rightward motion with the portion of the transcript that indicates the witness "turned" 136. Because the motion was in a rightward direction, the "turned" 118 action may have been a right turn 118-A.

Although the system may make an initial attempt at correlating the witness gestures to generic items within the image of the incident scene to specific names, the correlation may not always be correct. In order to address the situation where the correlation is not correct, the witness and/or first responder may be given an opportunity to review the correlations made between the generic identifiers and the specific identifiers to determine if they are correct.

Review transcript 140 may include the contents of the initial transcript 130 as well as the correlations made by the system. For example, the system may have correlated "this street" 142 with Park Street 114-A, as identified by the GIS system. This correlation may 143 be presented to the reviewer, with an option to either accept the correlation or edit the association of the generic identifier with the specific identifier. For example, if the first responder is able to determine that "this street" actually meant a different street than "Park Street" the first responder could select the edit button, and manually enter the correct specific identifier. Similarly, the association of "that street" 144 with Queens Street 116-A could be presented 145 to the user with the option to accept the association or edit the association. Finally, the action "turned" 146 could be associated with a right turn 118-A. As before, the option to accept or edit the association 147 is presented to the reviewer.

Assuming that the associations that are suggested by the system in the example presented with respect to FIG. 1 are all accepted, the system may generate a final transcript 150. The final transcript may include all the contents of the initial transcript 130. In addition, for each generic element identified in the initial transcript (e.g. "this street" 152, "that street" 154, "turned" 156) the associated specific identifier ([Park Street] 153, [Queens Street] 155, [Right Turn] 157) may be included to supplement the generic identifier. It should be noted that the specific identifier is used to supplement the initial transcript of the witness statement rather than simply replace the generic identifier because the initial witness statement may still be considered evidence, and as such cannot be modified to change the content without impacting the authenticity of the evidence. By supplementing the generic identifiers, the original statement of the witness remains available and unaltered.

Figure 2:
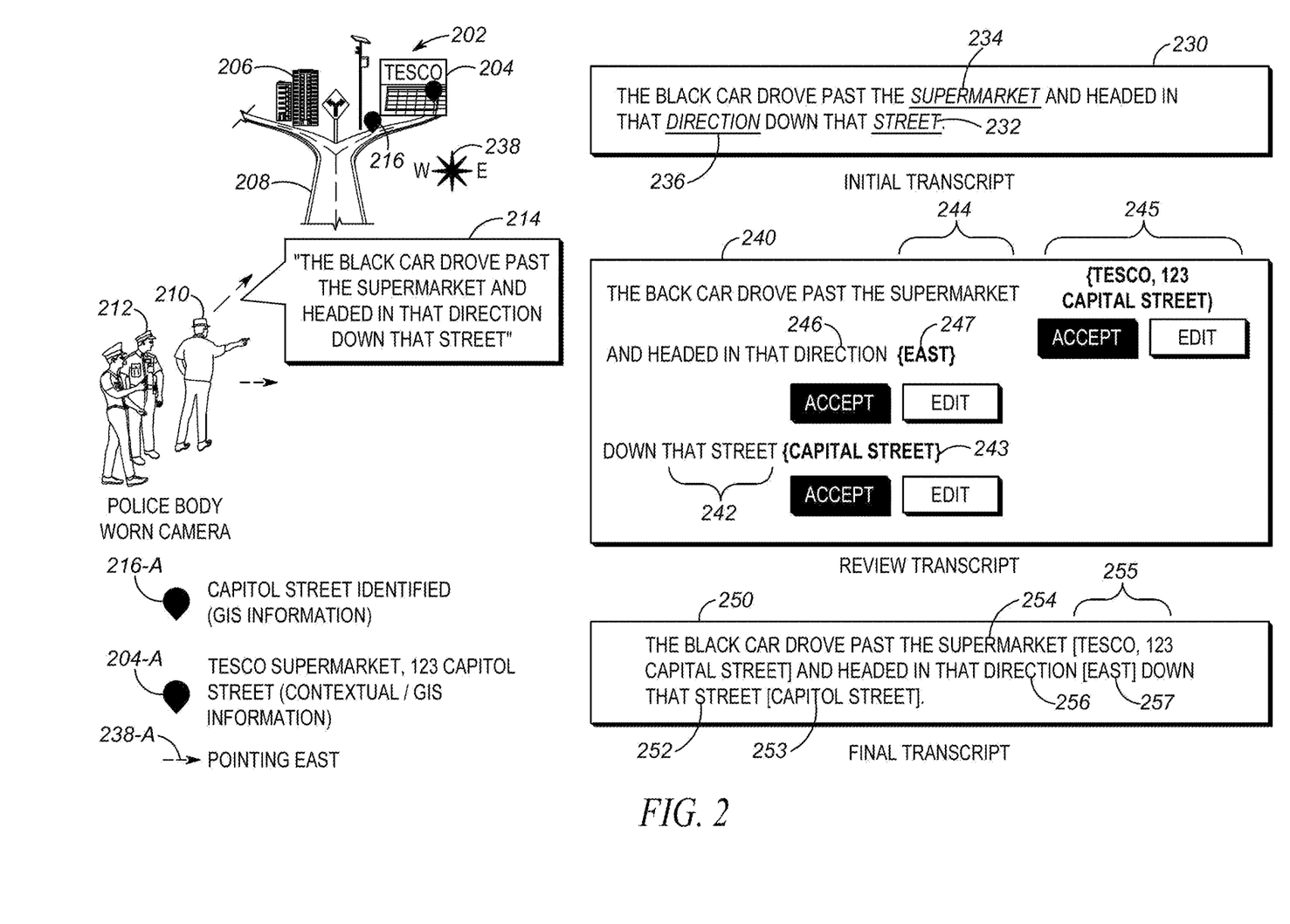
FIG. 2 is an example of converting generic geographic landmarks to specific names and addresses, in accordance with the techniques described herein.

FIG. 2 is an example of converting generic geographic landmarks to specific names and addresses, in accordance with the techniques described herein. In the example shown in FIG. 2, there is an incident scene 202. The incident scene may depict a road 208 with a supermarket 204 and an office building 206. There may be one or more first responders 212 responding to the incident scene. In the example, shown in FIG. 2, the first responders may be wearing body worn cameras. There may be more than one first responder, each with their own body worn camera. As explained above, having multiple cameras with multiple fields of view may be beneficial in determining exactly where a witness is pointing within the video image of the incident scene.

Just as above, there may be a witness 210 providing a statement regarding what they say at the incident scene. This statement may be transcribed into a textual initial transcript 230. In this example, the witness statement may be, "The black car drove past the supermarket and headed in that direction down that street" 214. The initial transcript 230 may include a transcription of the witness statement. Without viewing the video, it would not necessarily be easy to understand the transcript, as the generic terms (e.g. "supermarket", "direction", "that street") may be difficult to identify without a visual reference.

As above, the system may identify keywords in the transcript that may later be associated with specific identifiers. For example, just as above, the keyword "that street" 232 may be identified as a generic identifier. Also, just as above, the video analytics may be used to determine where in the incident scene the witness 210 is pointing. For example, the witness may be pointing to location 216. Via a GIS lookup, it may be determined that location 216 in the image of the incident scene may be identified as Capitol Street 216-A. Just as above, in the review transcript 240, the initial transcript may be duplicated, along with specific identifiers. In this example, "that street" is supplemented with the specific identifier Capitol Street and the reviewer is given the option to accept or edit the suggestion 243.

The system may also detect the keyword "supermarket" 234 in the initial transcript 230. Because the "supermarket" identifies a particular type of building (e.g. a store that sells groceries), the system may be able to use this context to eliminate other objects in the field of view from consideration. For example, the building 206 is clearly not a store that sells groceries. As the system is aware of the location of the video image (e.g. from a location associated with the incident, the GIS system identification of the street, etc.), the system can identify the type of building specified within the general area of the incident scene. For example, assume that at the incident scene there are several buildings, but only a smaller number of them are classified as stores that sell groceries. Based on this context, the system is able to eliminate all buildings that are not categorized as stores that sell groceries (e.g. building 206).

The system can further use video analytics to determine which store the user was pointing to when he said the "supermarket." This allows the system to first reduce the total number of possible specific identifiers based on context (e.g. supermarkets), and then select the specific identifier based on the indication from the witness. In this case, the possible locations are first reduced based on the type of building (e.g. supermarket) and then the specific building pointed to is identified. In this example, from the set of available supermarkets within the incident area, it may be determined that the witness was pointing to the Tesco Supermarket located at 123 Capitol Street 204-A. This specific identifier 245 may then be associated with the generic identifier 244 in the review transcript. Just as above, the reviewer may be given the option to accept or modify the determined specific identifier.

The system may also identify movement direction based keywords. In this example, the witness stated that the car was headed in "that" direction 236. The video analytics system may be used to determine which cardinal direction 238 the witness was pointing in when the phrase "that direction" was uttered. In the example, assume the witness was pointing east 238-A. Just as with the other generic elements identified above, the system may associate the generic identifier "that direction" 246 in the review transcript with the direction east 247 that was determined to be the specific identifier associated with the generic identifier 246. As before, the reviewer is given the option to accept or edit the proposed association.

The final transcript 250 may include the initial transcript 230, including the generic identifiers street 252, supermarket 254, and direction 256. The final transcript may also include the specific identifiers Capitol Street 253, Tesco 255, and East 257 that were accepted by the reviewer.

Figure 3:
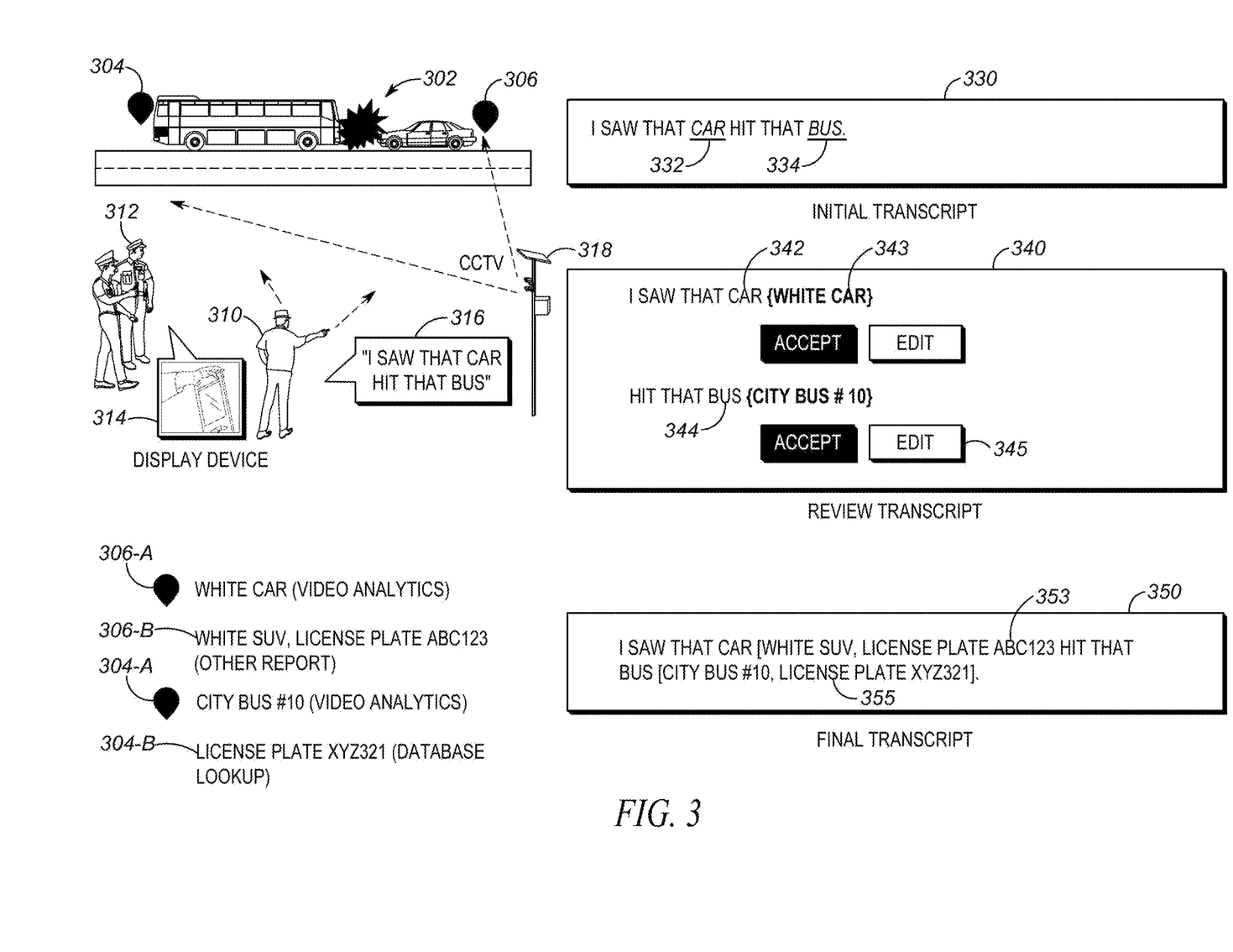
FIG. 3 is an example of converting generic object identifiers to specific object identifiers, in accordance with the techniques described herein.

FIG. 3 is an example of converting generic object identifiers to specific object identifiers, in accordance with the techniques described herein. In FIG. 3, there is an incident scene 302. In this example, the incident is a traffic accident between a bus 304 and a car 306. As with FIG. 2, assume that there are first responders 312 at the incident scene who are wearing body worn cameras. Also assume that there is a CCTV camera 318 capturing the incident scene. Assume that the first responders are also in possession of a display device 314. Operation of the display device will be described in further detail below.

As before, assume there is a witness 310 who is making a statement. In this example, the witness statement may be "I saw that car hit that bus" 316. As with the other examples, the witness statement 316 may be transcribed and included in the initial transcript 330. Again, as above the initial transcript may be reviewed to identify keywords. In this particular example, the keywords may be car 332 and bus 334.

The witness may have pointed to the car 306 and bus 304 and the system can determine where in the image the witness was pointing. The system may then use video analytics to identify characteristics of the generic identifiers. For example, the system may determine that the witness 310 pointed to car 306. Using video analytics, the system may determine that the car 306 is a white car 306-A. Likewise, the system may determine that the user pointed to bus 304 and video analytics is used to determine that the bus included signage indicating it was city bus number #10 304-A.

In the review transcript 340, the original transcript may be supplemented by including that the car 342 is a white car 343. The review transcript may also indicate that the bus 344 is city bus #10 345. As in the previous example, the user has the option to accept the association or edit the association.

In addition to the association of the generic identifiers to specific identifiers based on analysis of the video of the incident scene as well as other information sources (e.g. GIS sources, contextual information, etc.) the system may also use contextual information from other reports and/or data sources. For example, assume that there was a ticket issued to the driver of the car 306 for causing the accident with the bus 304. A record of the ticket may include information such as the license plate of the vehicle 306-B. The system may utilize this contextual information from other reports to enhance the current transcript. For example, in the final transcript 350, the specific identifier 353 may include the license plate of the white car that was included in the ticket that was issued to the white car 306. The other reports could be any other reports associated with the incident, including statements from other witnesses.

The sources of information are not limited to other reports. For example, the video analytics were able to determine that the bus 304 was city bus #10. There may be a city database that includes the license plate numbers 304-B of all city vehicles. The final transcript 350 could include the specific identifier 355 that includes the license plate obtained from the city database.

It was mentioned above that the first responders 312 may also be in possession of a display device 314. The display device may be any visual device that allows viewing of the images of the incident scene that are captured by the one or more cameras covering the incident scene 302. Examples of display devices 314 may include AR glasses, tablets, laptops, monitors, cell phone screens, walkie talkie screens, etc. The particular form of the display device is relatively unimportant.

As explained above, the user may be given the option to accept or edit the association of the specific identifier with the generic identifier when reviewing the transcript. However, in some cases, the system may have incorrectly determined where the user was pointing. For example, assume that there was a second car (not shown) at the incident scene and the system incorrectly identified the second car as the one the witness 310 was pointing to. The system may then indicate on the display device 314 which car was being associated with the phrase "that car" by displaying a visual indicator 304, 306 on the display device. The witness can view this visual indicator on the display device. If the indication is wrong (e.g. pointing to the wrong location within the incident scene), the witness may so indicate. Furthermore, the witness may be able to directly select the correct element within the incident scene. For example, in a display device with a touch interface, the user may simply tap on the screen to indicate which car in the image of the incident scene should be associated with the phrase "that car." As another option, the witness may drag and drop the visual indicator to the correct location within the incident scene as displayed by the display device 314. Once the correct association has been made, the process of finding the correct specific identifier can continue just as it was explained above. It should be understood that the use of the display device to correct the identification of elements within the incident scene applies to all the examples described herein, and not just those presented with respect to FIG. 3. It should also be understood that the review of the incident scene data need not occur at the same time as the witness statement is being taken. For example, the witness may provide a statement, and then at some later time (e.g. after the system has processed all of the information, etc.) the witness may be given the opportunity to review.

Figure 4:
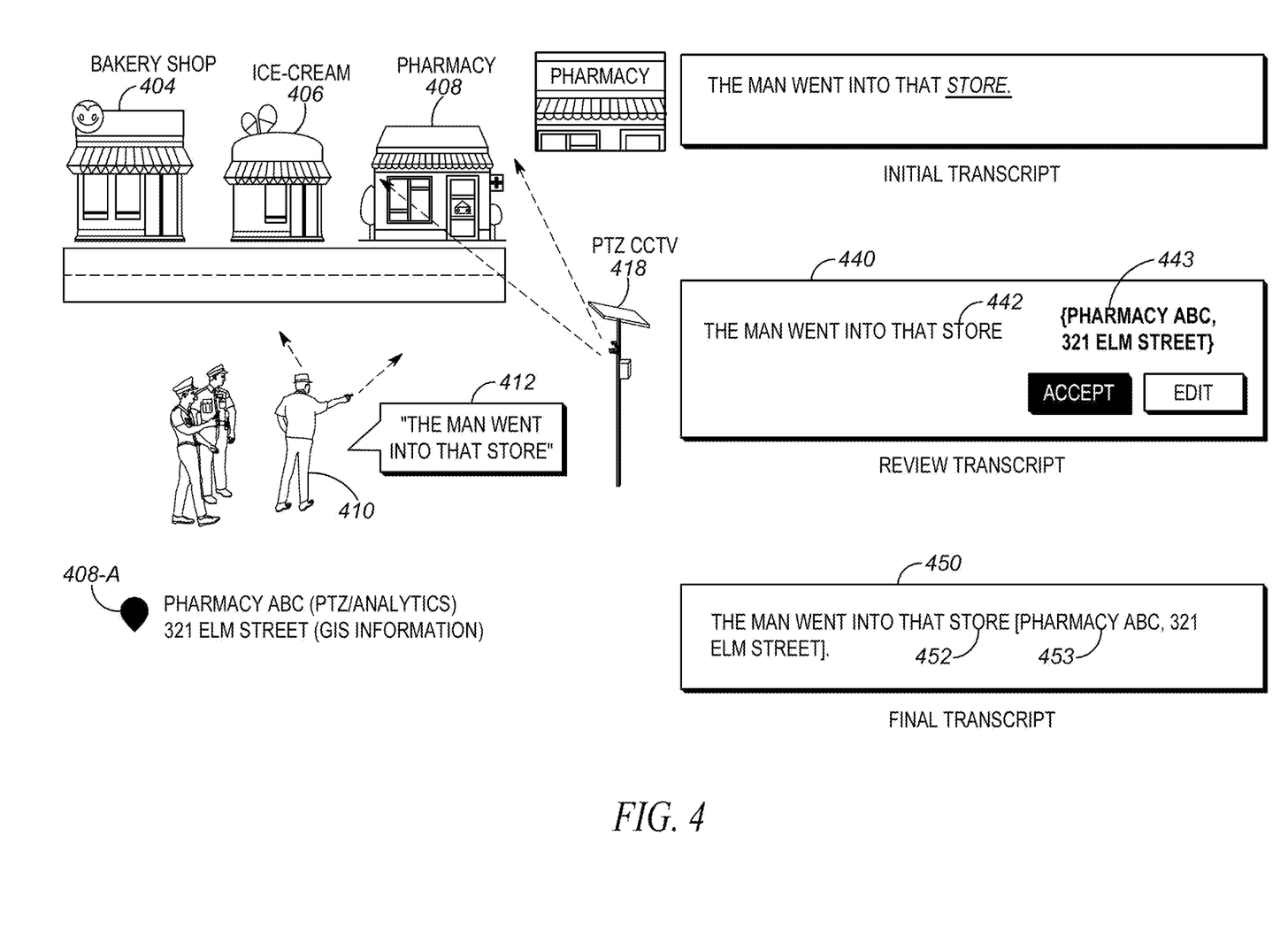
FIG. 4 is an example of controlling Pan-Tilt-Zoom functions of a camera to capture images of an object, in accordance with the techniques described herein.

FIG. 4 is an example of controlling Pan-Tilt-Zoom functions of a camera to capture images of an object, in accordance with the techniques described herein. In some cases, the camera covering an incident scene may not initially cover the incident scene completely. Consider the example in FIG. 4 in which the incident scene is covered by a Pan-Tilt-Zoom (PTZ) CCTV camera 418. A PTZ camera is a camera that can change its field of view by panning or tilting the camera. This is often done with a motorized platform that may physically move the camera to change the pan and tilt. The zoom function may be achieved mechanically via a lens on the camera that has a physical zoom setting or via an electronic zoom. Regardless of how it is formed, it should be understood that a PTZ camera can be commanded to alter its field of view as directed.

Incident scene 402 may include multiple stores, such as bakery 404, ice cream store 406, and pharmacy 408. Assume initially that the pharmacy 408 is not within the field of view of the PTZ CCTV camera 418.

A witness 410 may provide a statement 412 saying that "The man went into that store" while pointing to pharmacy 408. Because the pharmacy is not within the field of view of the camera, the particular store cannot be identified. However, the system may be able to determine the direction that the witness 410 is pointing to and cause PTZ camera 418 to focus in the direction that the witness has indicated. In some cases, the PTZ camera may be instructed to zoom into the area the witness appears to be pointing to. Once the PTZ camera has captured the location that the witness is referencing, the process may proceed as above.

For example, the specific location 408-A, such as the address of the store including its actual name (e.g. Pharmacy ABC) may be determined using GIS sources as well as other sources, as explained above. The review transcript may then include the specific reference 443 that has just been identified and associate it with the generic reference 442. The reviewer is, as always, given the option to accept or edit the proposed association. The final transcript 450 may be supplemented to include the specific identifier 453 associated with the generic identifier 452.

Figure 5:
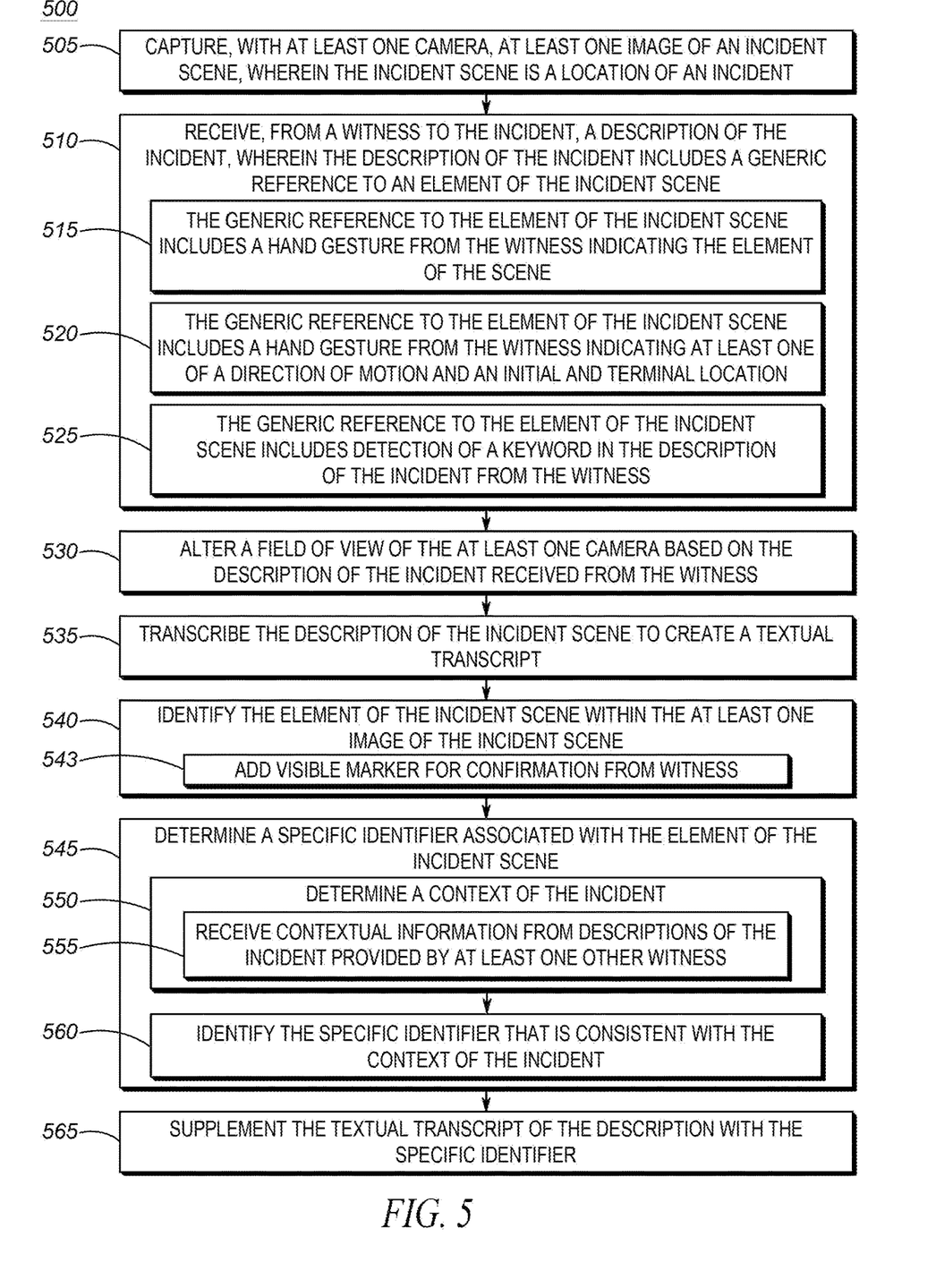
FIG. 5 is an example flow diagram depicting the witness report assistant techniques described herein.

FIG. 5 is an example flow diagram 500 depicting the witness report assistant techniques described herein. In block 505 at least one image of an incident scene may be captured with at least one camera. The incident scene is a location of an incident. There may be many different types of cameras that capture the incident scene. Some examples of cameras may be police officer body worn cameras, police vehicle dashboard cameras, public and private CCTV cameras, security cameras, surveillance cameras, etc. The techniques described herein are not dependent on any particular type or number of cameras. As will be explained in further detail below, a single camera may be sufficient to implement the techniques described herein, while more than one camera may improve the accuracy of identifying elements within the incident scene.

In block 510, a description of the incident may be received from a witness to the incident. The description of the incident includes a generic reference to an element of the incident scene. As described in further detail below, the witness may describe the incident scene using generic language, such as "that building" or "that direction" while potentially gesturing with his body (e.g. pointing with his hands, etc.) to the specific element in the incident scene. The witness may use generic references because their description is based on the ability of the person taking the witness description to visually see what the witness is gesturing towards. In some cases, the witness may use generic references to elements, because the witness does not know the specific identifier of the element. For example, the witness may point to a building and say "that building" rather than the building address, because the witness may not actually know the address.

In block 515, the generic reference to the element of the incident scene includes a hand gesture from the witness indicating the element of the scene. For example, the witness may point to an element in the scene while generically describing the specific element. For example, the witness may say "that car" to refer to a car generically, while at the same time pointing to a specific car within the incident scene. A person present at the incident scene would be aware of which car is being referred to, based on the hand gesture from the witness. As explained above, a transcript of the generic reference to "that car" would be difficult to understand absent visual knowledge of the hand gesture at the time the description was provided.

In block 520, the generic reference to the element of the incident scene includes a hand gesture from the witness indicating at least one of a direction of motion and an initial and terminal location. In some cases, the witness may make hand gestures that do not refer to a specific element of the incident scene, but instead generically describe movement or direction within the incident scene. For example, the witness description may say that the car went "that way" while the witness pointed in a cardinal direction (e.g. North, East, etc.). In some cases, the witness description may include generic references to an initial and a terminal location. For example, the witness may say the car came from "that direction" and then left in "that direction." The witness may have been pointing in the direction that was being referenced.

In block 525, the generic reference to the element of the incident scene includes detection of a keyword in the description of the incident from the witness. In some cases, the witness may describe the incident scene by using a generic identifier for the type of element that is being referred to. For example, the witness may say "the man went into the grocery store" without providing a specific reference to which grocery store (e.g. name of the grocery store, address of the grocery store, etc.). The system may monitor for such keywords, which may then be used, as described below, to replace the generic reference to the keyword, with a specific reference that better identifies the element in the incident scene.

In block 530, a field of view of the at least one camera may be altered based on the description of the incident received from the witness. For example, the witness may point to something that is not currently in the field of view of the camera. In a camera equipped with PTZ functionality, the camera's field of view may be adjusted by modifying the pan, tilt, and/or zoom of the camera to alter the field of view such that the camera will include the element to which the witness is gesturing. The alteration need not be an automatic alteration. For example, in the case of a body worn camera, the witness may make a gesture that is outside of the field of view of the body worn camera, and the officer may physically move their body to capture the gesture. What should be understood is that the field of view of the camera may be adjusted such that the camera captures whatever it is the witness is referring to when they make a generic statement describing an element in the incident scene.

In block 535, the description of the incident scene may be transcribed to create a textual description. As mentioned above, transcription techniques are constantly improving and are able transcribe verbal descriptions into text with ever increasing accuracy. Although the accuracy of the transcription may always be improving, the transcription itself may not be able to capture the actual context of the description, as the transcription only operates on the verbal description. The transcription process is the first step in providing improvements to the witness report, according to the techniques described herein. It should be noted that any currently available or future developed transcription technology would be usable by the techniques described herein.

In block 540, the element of the incident scene within the at least one image of the incident scene is identified. As mentioned above, at least one camera is capturing images of the incident scene. The at least one camera may capture the location where a witness is gesturing when describing the incident system. The system is able to identify what the user is gesturing toward by analyzing the video images and using known techniques to identify where in the image the user is gesturing. As is well known, the inclusion of multiple cameras may allow the system to more accurately determine the location being gestured toward in the incident scene by combining the images and triangulating the location within the incident scene. Techniques for identifying what is being pointed to in an image scene by using one or more video images captured from a camera are known. The techniques described herein are not dependent on any particular method for identifying what the witness is gesturing toward in the incident scene, so long as the element being gestured toward can be identified.

In block 543, a visible marker may be added to a display device for confirmation from the witness. As explained above, the witness may be show the image of the incident scene with visible markers indicating the generic elements that the system believes the witness was indicating. These visible markers can then be confirmed as being correct by the witness. If the visible markers are not correct (e.g. not indicating what the witness was actually referring to), the witness can correct the element that was being indicated. For example, the visible markers, via the display device, could be dragged and dropped to the correct location within the incident scene as displayed by the display device.

In block 545, a specific identifier associated with the element of the incident scene is determined. Once the element in the incident scene is identified, various information sources may be used to generate a specific identifier associated with the element. For example, if the witness points in a general direction, the specific identifier may include a cardinal direction (e.g. North, East, etc.). If a witness points in the direction of a street, a GIS database may be referenced to determine the name of the street. Likewise, if the witness points to a specific location, the GIS system may be used to identify an address and/or name of the location. If the witness gestures indicating motion (e.g. went from here to there, etc.) the specific direction of the motion (e.g. turned rightward, etc.) may be identified.

In block 550, a context of the incident may be determined. For example, context of an incident may be used to determine generally what types of information may be referred to by the witness. For example, if the context of the incident is a traffic accident, keywords may include vehicle related keywords (e.g. cars, busses, roads, etc.). In block 555, contextual information from descriptions of the incident provided by at least one other witness may be received. In some cases, there may be multiple witnesses that are describing the incident scene. Information from the description of one witness may be useful in determining the context of the description of another witness. For example, the initial witness may refer to a white car in an accident. Another witness may describe the license plate of the car in the accident. By determining that the context is a vehicle accident, the system may determine that both descriptions are referencing the same element. The description of the white car can then be supplemented with the actual license plate information from the second witness description.

In block 560, the specific identifier that is consistent with the context of the incident may be identified. For example, if the witness has referred to a grocery store in their description, and pointed to a group of several buildings, of which only one is a grocery store, the system may identify the grocery store as the generic element in the incident scene that is being referred to, even if the video image is not completely clear as to which building the witness is pointing to. The reason for this being that if the context of the incident relates to a grocery store, the likelihood that the witness is referring to that grocery story is greater than the witness referring to one of the other buildings within the incident scene.

In block 565, the textual transcript of the description is supplemented with the specific identifier. As described above, the user may be given the option to accept or edit the specific element identifier. If the user chooses to accept the specific element identifier, the textual description may be supplemented to include the specific identifier. However, it should be understood that the generic reference to the element is not removed, as this generic reference is what was actually used in the description provided by the witness. The original witness description may be considered evidence that must remain unaltered. The supplemented description may be indicated as such (e.g. enclosed in brackets, etc.) to indicate that the system assisted in providing the supplemented description and that it was not part of the original witness statement.

Figure 6:
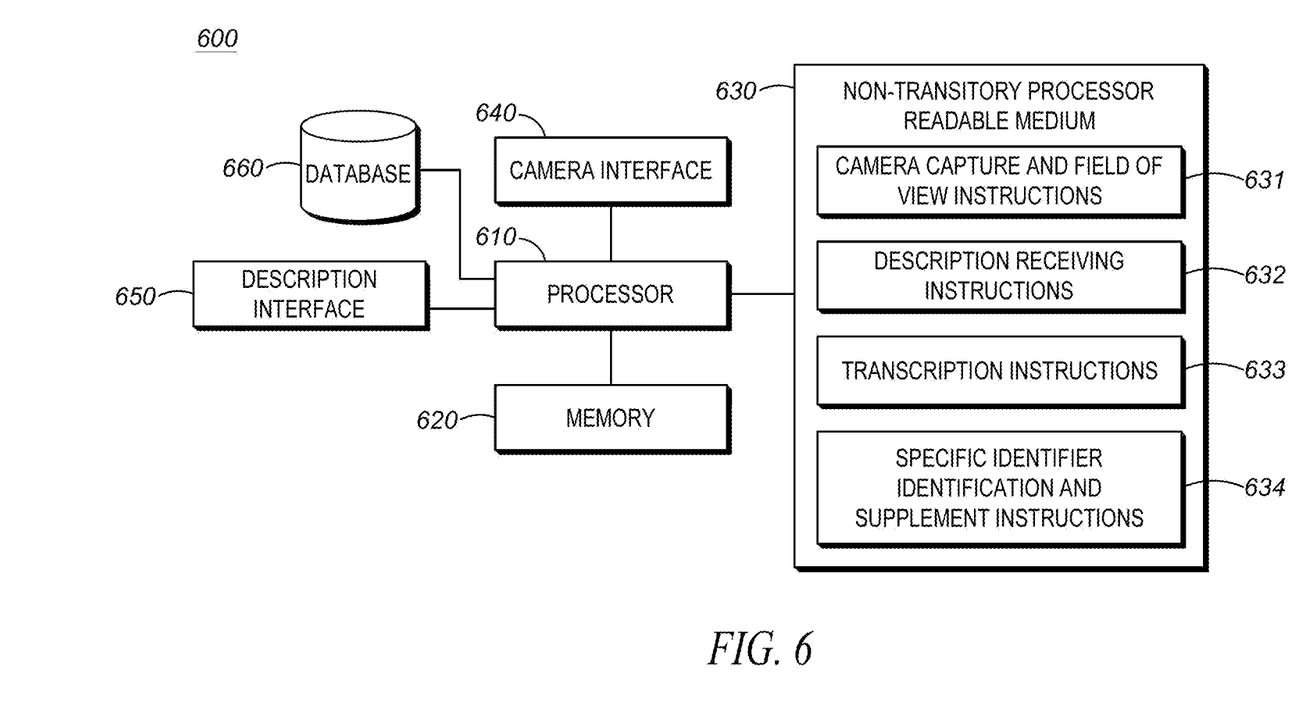
FIG. 6 is an example device that implements the witness report assistant techniques described herein.

FIG. 6 is an example device 600 that implements the witness report assistant techniques described herein. For example device 600 may implement a computing device that receives witness descriptions and supplements a transcript that includes generic element identifiers with specific element identifiers. It should be understood that device 600 represents one example implementation of a computing device that utilizes the techniques described herein. Although only a single processor is shown, it would be readily understood that a person of skill in the art would recognize that distributed implementations are also possible. For example, the various pieces of functionality described above (e.g. generic element identifier determination, specific element identifier supplementing, etc.) could be implemented on multiple devices at the edge or at the cloud network that are communicatively coupled. FIG. 6 is not intended to imply that all the functionality described above must be implemented on a single device.

Device 600 may include processor 610, memory 620, non-transitory processor readable medium 630, camera interface 640, description interface 650, and database 660.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include camera capture and field of view instructions 631. The camera capture and field of view instructions 631 may cause the processor to receive images from at least one camera through the camera interface 640. The camera interface 640 may also be used to allow the processor to alter the field of view of at least one camera in order to cause the field of view to better capture the incident scene as being described by the witness. The camera capture and field of view instructions 631 are described throughout this description generally, including places such as the description of blocks 505 and 530.

The medium 630 may include description receiving instructions 632. The description receiving instructions 632 may cause the processor to receive a verbal description from the witness through the description interface 650. For example, the verbal description may be received by an audio recording device that includes a microphone, such as a body worn camera, or any other type of camera. In some cases, the audio and video may be captured from the same device and the camera interface 640 and the video interface 650 may be the same interface. The description receiving instructions 632 are described throughout this description generally, including places such as the description of blocks 510-525.

The medium 630 may include transcription instructions 633. The transcription instructions 633 may cause the processor to take the verbal description received through the description interface 650 and transcribe it into a textual description. The transcription instructions 633 are described throughout this description generally, including places such as the description of block 535.

The medium 630 may include specific identifier identification and supplement instructions 634. The specific identifier identification and supplement instructions 634 may cause the processor to identify elements with the field of view of the camera that have been referred to with a generic identifier and supplement the description with a specific identifier. For example, the specific identifier may be retrieved from a database 660, such as a GIS database. The generic identifier may then be supplemented with a specific identifier that identifies the element referred to by the generic identifier with more specificity. The specific identifier identification and supplement instructions 634 are described throughout this description generally, including places such as the description of blocks 540-565.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot automatically identify generic elements in an image scene and replace them with specific identifiers and determine where in an image scene a witness is gesturing to, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate element or device via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   capturing, with at least one camera, at least one image of an incident scene, wherein the incident scene is a location of an incident;
   receiving, from a witness to the incident, a verbal description of the incident, wherein the verbal description of the incident includes a generic reference to an element of the incident scene;
   transcribing the verbal description of the incident scene to create a textual transcript;
   identifying the element of the incident scene within the at least one image of the incident scene;
   determining a specific identifier associated with the element of the incident scene; and
   supplementing the textual transcript of the verbal description with the specific identifier.

2. The method of claim 1 wherein the generic reference to the element of the incident scene includes instructions to detect a hand gesture from the witness indicating the element of the scene.

3. The method of claim 1 wherein the generic reference to the element of the incident scene includes instructions to detected a hand gesture from the witness indicating at least one of a direction of motion and an initial and terminal location.

4. The method of claim 1 wherein the generic reference to the element of the incident scene includes detection of a keyword in the verbal description of the incident from the witness.

5. The method of claim 1 further comprising:
   altering a field of view of the at least one camera based on the verbal description of the incident received from the witness when the generic reference is not viewable in an initial field of view of the at least one camera.

6. The method of claim 1 wherein the instructions to identify the specific identifier associated with the element of the incident scene further comprises instructions to:
   determining a context of the incident; and
   identifying the specific identifier that is consistent with the context of the incident.

7. The method of claim 1 wherein the instructions to determine the context of the incident further comprises instructions to:
   receiving contextual information from descriptions of the incident provided by at least one other witness.

8. A system comprising:
   a processor; and
   a memory coupled to the processor, the memory containing a set of instructions thereon that when executed by the processor cause the processor to:
     capture, with at least one camera, at least one image of an incident scene, wherein the incident scene is a location of an incident;
     receive, from a witness to the incident, a verbal description of the incident, wherein the verbal description of the incident includes a generic reference to an element of the incident scene;
     transcribe the verbal description of the incident scene to create a textual transcript;
     identify the element of the incident scene within the at least one image of the incident scene;

determine a specific identifier associated with the element of the incident scene; and
supplement the textual transcript of the verbal description with the specific identifier.

9. The system of claim 8 wherein the generic reference to the element of the incident scene includes instructions to detect a hand gesture from the witness indicating the element of the scene.

10. The system of claim 8 wherein the generic reference to the element of the incident scene includes instructions to detected a hand gesture from the witness indicating at least one of a direction of motion and an initial and terminal location.

11. The system of claim 8 wherein the generic reference to the element of the incident scene includes instructions to detect a keyword in the verbal description of the incident from the witness.

12. The system of claim 8 further comprising instructions to:
alter a field of view of the at least one camera based on the verbal description of the incident received from the witness when the generic reference is not viewable in an initial field of view of the at least one camera.

13. The system of claim 8 wherein the instructions to identify the specific identifier associated with the element of the incident scene further comprises instructions to:
determine a context of the incident; and
identify the specific identifier that is consistent with the context of the incident.

14. The system of claim 13 wherein the instructions to determine the context of the incident further comprises instructions to:
receive contextual information from descriptions of the incident provided by at least one other witness.

15. A non-transitory processor readable medium containing a set of instructions thereon that when executed by a processor cause the processor to:
capture, with at least one camera, at least one image of an incident scene, wherein the incident scene is a location of an incident;
receive, from a witness to the incident, a verbal description of the incident, wherein the description of the incident includes a generic reference to an element of the incident scene;
transcribe the verbal description of the incident scene to create a textual transcript;
identify the element of the incident scene within the at least one image of the incident scene;
determine a specific identifier associated with the element of the incident scene; and
supplement the textual transcript of the verbal description with the specific identifier.

16. The medium of claim 15 wherein the generic reference to the element of the incident scene includes instructions to detect a hand gesture from the witness indicating the element of the scene.

17. The medium of claim 15 wherein the generic reference to the element of the incident scene includes instructions to detected a hand gesture from the witness indicating at least one of a direction of motion and an initial and terminal location.

18. The medium of claim 15 wherein the generic reference to the element of the incident scene includes instructions to detect a keyword in the verbal description of the incident from the witness.

19. The medium of claim 15 further comprising instructions to:
alter a field of view of the at least one camera based on the verbal description of the incident received from the witness when the generic reference is not viewable in an initial field of view of the at least one camera.

20. The medium of claim 15 wherein the instructions to identify the specific identifier associated with the element of the incident scene further comprises instructions to:
determine a context of the incident; and
identify the specific identifier that is consistent with the context of the incident.

* * * * *